March 10, 1964     G. L. BRIDGER ETAL     3,124,159
APPARATUS FOR REACTING A PLURALITY OF LIQUID COMPONENTS
Original Filed Sept. 3, 1959
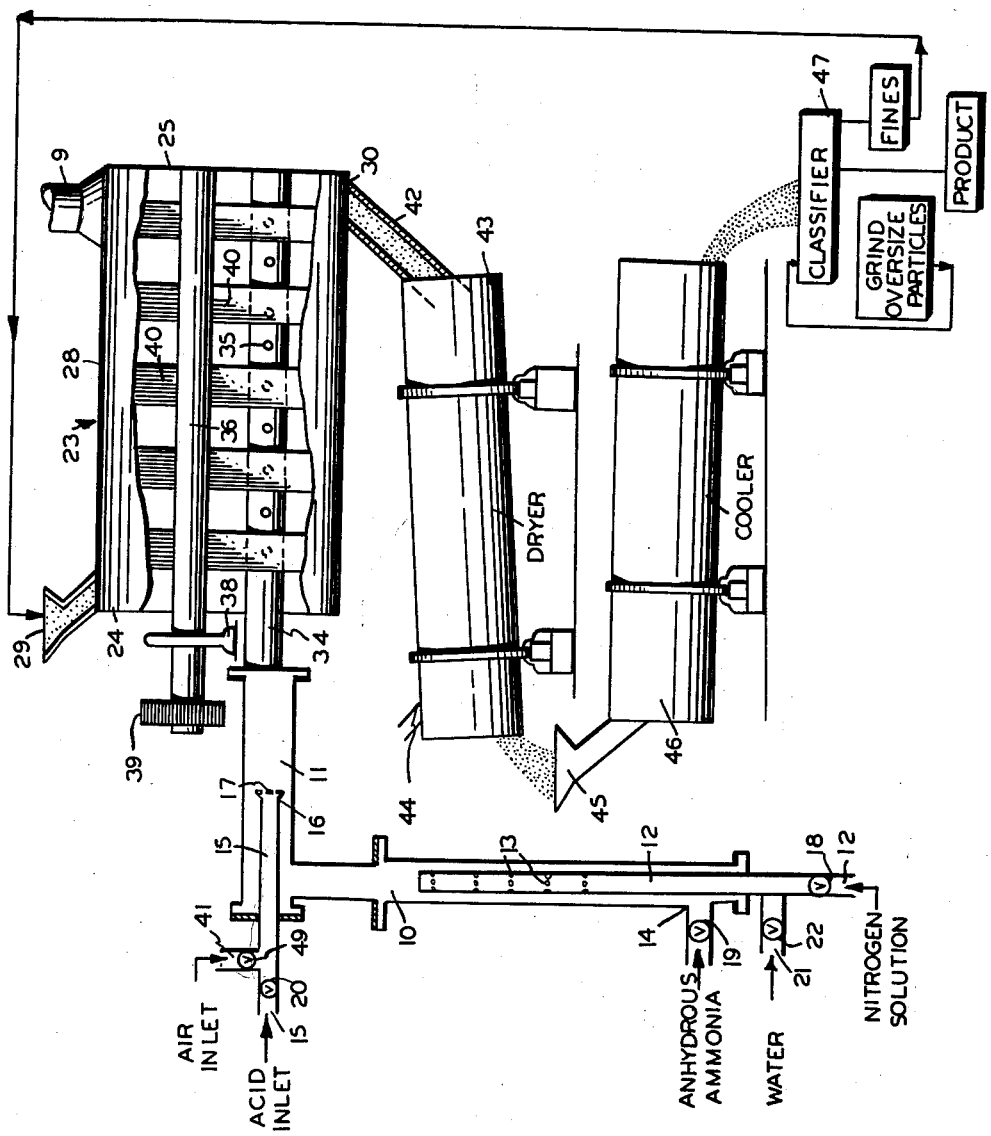
*INVENTORS*
NORVAL K. ALFREY
GROVER L. BRIDGER
BY *Metro Kalimon*
ATTORNEY

United States Patent Office 3,124,159
Patented Mar. 10, 1964

3,124,159
APPARATUS FOR REACTING A PLURALITY OF LIQUID COMPONENTS
Grover L. Bridger and Norval K. Alfrey, Baltimore, Md., assignors to W. R. Grace & Co., New York, N.Y., a corporation of Connecticut
Application June 10, 1960, Ser. No. 35,169, which is a division of application Ser. No. 837,943, Sept. 3, 1959. Divided and this application Nov. 3, 1960, Ser. No. 66,974
1 Claim. (Cl. 137—604)

This invention relates to a process for preparing mixed granular fertilizers. In a particular aspect, it has reference to a process wherein liquid fertilizer ingredients are first pre-reacted and thereafter added to solid fertilizer material. In another aspect it relates to an apparatus suitable for carrying out the mixing and granulating operations on a continuous basis.

This application is a division of patent application Serial No. 35,169, filed June 10, 1960, which in turn is a division of patent application Serial No. 837,943, filed September 3, 1959.

Fertilizers usually contain one, but more often, two or all three of the main elements which are needed for growing crops, i.e., nitrogen, phosphorus, and potassium. A mixture containing all three elements in the desired proportions is said to be a complete fertilizer and it is common practice to speak of such compositions in terms of percentages of N, $P_2O_5$, and $K_2O$ in forms available to growing crops and expressed in that order. For example, a formula such as 5–10–5 refers to a mixture containing 5% N, 10% $P_2O_5$ and 5% $K_2O$. Quite often fertilizer formulas are evaluated in terms of units where one unit is 1% of a ton or 20 pounds.

Granulated fertilizers have gained a premier position in the fertilizer industry. From the manufacturer's point of view, granulation permits a reduction in operating cost by using more low-cost nitrogen solution without encountering difficulties in physical condition. Further, a higher analysis product is obtained by use of nitrogen solution with an attendant reduction of handling and shipping costs per unit of plant food. From the consumer's standpoint, granular material is easier to handle, less dusty, caking is avoided, and it can be applied with greater uniformity.

Many processes are now in use for preparing granulated fertilizer materials and mixtures. One method involves dry mixing by blending the respective raw materials in granular form. This procedure is usually followed in preparing non-nitrogen containing mixtures such as blending granular superphosphate with granular potash. However, this method has its disadvantages in preparing complete fertilizers because the individual granular constituents tend to segregate and results in a non-homogeneous product. Another method involves first ammoniating a mixture of granular superphosphate and a potassium salt, thereafter wetting the ammoniated mix with sufficient water to cause granulation of all ingredients, and then removing the water in a dryer. This method has its disadvantages in that ammonia solutions not only are difficultly absorbed by the granulated superphosphate but the slow rate of reaction of the ammonia with the granulated superphosphate causes high ammonia losses. It is not uncommon to lose ammonia in the neighborhood of 10–15% of the total nitrogen present. In addition to high ammonia losses, the resulting objectionable ammonia odors around the apparatus and surrounding atmosphere and the formation of ammonium chloride fume in the mixer cause dangerous and unpleasant working conditions.

The present trend in granulation techniques is to integrate the granulation and ammoniation steps. This involves the use of a portion of solid ingredients and another portion of liquid materials, the liquid portion consisting of the nitrogen carrier. This process is generally carried out on a batch basis and comprises forming a mix of superphosphate and a potassium salt and thereafter introducing a solution of the nitrogen carrier in contact with the solid ingredients. The nitrogen carrier may be simply anhydrous or aqua ammonia, or ammonia supplemented with a nitrogen solution.

The mixing of liquids with solids, however, has presented serious problems with respect to generation of toxic gases and noxious fumes. Fume formation results from the reaction between sulfuric acid and muriate of potash which forms HCl and the subsequent reaction between the HCl and $NH_3$ which produces a dense white cloud consisting of finely divided ammonium chloride. Moreover, in the presence of liquids, the free acid in superphosphate reacts with some of the muriate of potash to form acid gases. The release into the atmosphere of such gases coupled with the release of the ammonium chloride dust and escaping ammonia vapors not only creates an undesirable condition but has plagued fertilizer manufacturers no end with nuisance suits. Efforts to abate such fumes include the use of elaborate scrubbing and collection systems which, while not altogether satisfactory, have added an additional cost to the manufacturer.

The present invention, therefore, provides a process and an apparatus for preparing granular fertilizers on a continuous basis by contacting liquid and solid fertilizer constituents while avoiding the prior art difficulties respecting fume formation and production of toxic gases. The approach in this process to the elimination of the objectionable fumes and gases is premised on the avoidance of its formation in the first instance. This is accomplished by first neutralizing all acid ingredients in the liquids and thereafter introducing the resulting solution or suspension in a novel manner into a mass of fertilizer ingredients under conditions conducive to granulation of the admixed mass. Operation of the liquids neutralization step is carried out in the presence of excess ammonia which results in a final pre-neutralized solution or suspension having a pH greater than 7.0.

Broadly, the process comprises charging a mass of particulate solid material into a mixing zone while continuously kneading and subdividing the mass centrally and longitudinally into substantially two portions with progressive advancement of the material to the discharge end of the mixing zone. A nitrogen-containing fluid is continuously passed between the respective portions of the subdivided mass in contact with each portion of solid material at a rate substantially sufficient to neutralize the acidity of the solid material and continuously withdrawing the resulting material from said zone. By "nitrogen-containing fluid" is meant aqua ammonia, anhydrous liquid or gaseous ammonia, ammonium nitrate, urea, commercial nitrogen solutions, or other nitrogen-bearing compounds usually employed in fertilizer manufacture, alone or mixtures thereof. The term is also embracive of solutions which have been pre-neutralized with an acidic substance.

The composition of the granulated material will depend upon the particular fertilizer raw materials and grade desired. The principal ingredient of the mixed fertilizer is acid-treated phosphate rock such as superphosphate and triple superphosphate. Superphosphate is prepared by decomposing phosphate rock with sulfuric acid and consists principally of monocalcium phosphate and calcium sulfate. Triple superphosphate is made by reacting pulverized phosphate rock with phosphoric acid and consists principally of monocalcium phosphate and some free phosphoric acid. Ordinary superphosphate usually contains from 18 to 20% available phosphoric acid ($P_2O_5$) while triple superphosphate contains from 40 to 50% available phosphoric acid. It is also within the scope of this invention to use a mixture of normal and triple superphosphate with or without the addition of phosphoric acid.

In preparing a mixed fertilizer containing nitrogen and phosphorus, a finely divided acidic material such as superphosphate is charged to a mixer and thereafter admixed with a nitrogen-containing fluid such as anhydrous or aqua ammonia. The ammonia is first treated with a mineral acid, such as sulfuric, in amount sufficient to neutralize the ammonia and form a solution of ammonium sulfate containing sufficient free ammonia to neutralize the acidity of the superphosphate. If a complete fertilizer is desired, the superphosphate is first admixed with a potassium salt, such as muriate of potash, before contact is made with the nitrogen-containing fluid. The solid feed materials are ground, preferably to a size passing through a 5 mesh U.S. screen, but may vary somewhat in screen analysis without adversely affecting the ammoniation and granulation processing operation. The wetness of the solid feed material charged to the mixer may also vary from a minimum of 0.2% moisture content in the muriate of potash to approximately a 10% maximum in the superphosphate.

Ammoniation of superphosphate is usually limited to 6 lbs. of free ammonia per unit of APA from normal superphosphate and 4 lbs. of free ammonia per unit of APA from triple superphosphate. While normal superphosphate can be reacted theoretically with about 9 lbs. of ammonia and triple superphosphate with about 6 lbs., it is impractical to use the theoretical limits because the ammonia tends to cause the $P_2O_5$ in the normal and triple superphosphate to revert to citrate insoluble $P_2O_5$. In such form, the $P_2O_5$ is unavailable to plants. Therefore, to further increase the nitrogen content in the fertilizer composition, compounds other than ammonia must be added. This increase may be obtained through use of a nitrogen solution. Nitrogen solution is a term referring to solutions of ammonia and other compounds of nitrogen in water and such solutions may be formed in situ or obtained commercially. These solutions are an inexpensive source of fixed nitrogen and provide free ammonia nitrogen for the formulation. They contain water, and either ammonium nitrate or urea or both, with free ammonia dissolved therein. Typical compositions of such solutions are:

AMMONIUM NITRATE-AMMONIA SOLUTIONS

| Solution | Ammonium Nitrate, Percent | Anhydrous Ammonia, Percent | Water, Percent | Urea, Percent | Total Nitrogen |
|---|---|---|---|---|---|
| 2A | 65.0 | 21.7 | 13.3 | | 40.6 |
| 3 | 55.5 | 26.0 | 18.5 | | 40.8 |
| 4 | 66.8 | 16.6 | 16.6 | | 37.0 |
| 16 | 65.6 | 19.0 | 9.4 | 6.0 | 41.4 |

UREA-AMMONIA SOLUTION

| Solution | Urea (Fixed), Percent N | Ammonia (Free), Percent N | Water Content, Percent |
|---|---|---|---|
| A | 15.1 | 30.4 | 24.8 |
| B | 20.2 | 25.3 | 17.6 |
| C | 12.3 | 24.7 | 38.6 |
| D | 16.4 | 20.6 | 32.8 |

The crux of the process of this invention, therefore, is to pre-react the respective liquid ingredients to neutralize all acids and then contact the solid fertilizer constituents with the resulting pre-reacted solution having a pH greater than 7.0 in a manner as described hereinafter.

In carrying out the process, reference is made to the drawing in which:

FIG. 1 represents a schematic flow sheet and apparatus for premixing and pre-reacting the liquid ingredients, side view of apparatus partly in section for admixing the pre-reacted liquids and solids while granulating the same (shown generally as 23), dryer, cooler, and classifier means, all arranged for continuous operation.

Referring to the drawing, the liquid fertilizer ingredients are blended in an apparatus constructed of suitable non-corroding piping and consists of all tubing on the left hand side of FIG. 1 terminating with chamber 11. The apparatus comprises a first blending chamber 10 communicating with a second blending chamber 11. A delivery tube 12 of smaller diameter than chamber 10 and provided with a plurality of wall openings 13 is disposed concentrically for a distance within the chamber 10 to provide annular space between the tube and the chamber. A second delivery tube 14 communicates with and leads to the annular space provided in chamber 10. A third delivery tube 15 of smaller diameter than chamber 11 is concentrically positioned for a distance in chamber 11 to provide annular space between the tube 15 and chamber 11. The portion of tube 15 which is disposed in chamber 11 terminates in a spray head 16 at a point beyond which chamber 10 communicates with chamber 11 and consists of a plurality of openings 17. Each of the aforementioned tubes is provided with means, such as valves 18, 19 and 20, to regulate the flow of the respective liquids.

In pre-reacting various liquid fertilizer ingredients, an ammoniacal fluid, such as liquid anhydrous ammonia, is drawn from a suitable supply source (not shown) and passed into the annular space of chamber 10 via tube 14. A nitrogen solution of a given composition, drawn from a supply source (not shown), is delivered into chamber 10 via tube 12 in a plurality of streams issuing through openings 13 and intimately mixed with the ammonia in the annular space of chamber 10. Anhydrous ammonia may be dissolved by water entering chamber 10 via tube 21, the flow of which is regulated by valve 22. If the ammoniacal liquid is aqua ammonia, water addition may be dispensed with. The resulting blended solution is thereafter passed into chamber 11.

A mineral acid, such as sulfuric, is delivered into chamber 11 in a plurality of streams issuing from tube 15 through openings 17 in contact with the blended solution entering from chamber 10. Pre-neutralization of the acid occurs in the region slightly beyond the spray head 16. The reaction of the acid with the ammonia in the mixture is strongly exothermic and yields ammonium sulfate with attendant formation of steam. The heat of reaction is useful in preparing the granulated product and is passed along with the steam, reaction products and free ammonia for granulation with the solid ingredients. Phosphoric acid or nitric acid may be substituted for the sulfuric acid, or any combination of mineral acid mixtures may be used. The amount of acid added is such that there will be present after reaction with the ammonia sufficient free ammonia to neutralize the acidity of the solid fertilizer ingredients. The resulting preneutralized solution exhibits an alkaline pH, i.e., of the order greater than 7.

Mixing of the solid and liquid ingredients is carried out in an enclosed stationary mixing apparatus, shown generally at 23, formed of front and rear walls 24 and 25 connected by side walls (shown partly cut away), a top covering lid 28 and having inlet means 29 in the front top lid portion for feeding solid material therein and discharge means 30 located in the rear bottom portion for removing product therefrom. The lid 28 may be dispensed with since the present process of pre-reacting all liquid ingredients eliminates noxious gas and fume formation. However, its use may be advisable during start-up operations to contain any escaping fumes which may inadvertently form. These may be exhausted through vent 9. The bottom of the mixer comprises a pair of horizontally disposed elongated juxtaposed troughs (shown partly cut away) integrated with the respective side walls and extending longitudinally from the front wall to the rear wall. The base of each trough is arcuate-shaped which curves and rises to a crest at about a 45° angle toward the center of the mixer and for a distance short of joining the two troughs to provide space therebetween. An elongated concave seat (not shown) is disposed in the space between the troughs above their bases which is adapted to accommodate a distributor conduit 34 which is secured to the seat by weld spots and extends outwardly through the front wall in communication with chamber 11. The portion of the conduit 34 residing in the mixer is provided with a plurality of diametrically-opposed spaced side openings 35 for discharging streams of solution in the direction of the side walls.

Mounted centrally for axial rotation in each trough are elongated shafts 36 which bear a plurality of spaced radial blades 40. The shafts extend through the front wall 24 where they are secured by means of a support 38 and rotated by gear 39. The gears of the respective shafts mesh with a third gear (not shown) for counterrotation thereof. The blades 40 are of sufficient length so as to provide only a small clearance between their tips and the walls of the mixer to permit clean sweeping of the material from the bottom of the trough during operation and thereby prevent build-up and caking. The blades may be set at a pitch or their surfaces may be turned to simulate propellers for progressive movement of material through the mixer.

In carrying out the process for preparing the granulated product, valve 49 is opened and air is first introduced under pressure through line 41, which communicates with line 15, then passed into chamber 11 and thence into conduit 34 to clear any material plugging openings 35. After a short period, the air flow is stopped, the shafts are caused to rotate by a suitable power source (not shown), and solid feed material consisting of finely divided superphosphate and muriate of potash, for example, is introduced into the mixer via inlet 29. By disposing the seat between the troughs and at a level above the trough bases but below the level of the respective shafts, the material is constantly divided centrally and longitudinally into two portions although only of momentary duration with respect to the identity of the separated portions. The radial blades counterrotate upwardly from the center of the mixing chamber and intermesh above the trough division, that is, above the point at which seat accommodating distributor conduit 34 is disposed. This produces a constant retumbling of material upon itself and adjoining particles accompanied by a continuous interchange of material from one trough to the other.

A solution consisting of the reaction products of sulfuric acid, liquid anhydrous ammonia, water and nitrogen solution, together with free ammonia and the heat and steam formed during the reaction is passed from chamber 11 into conduit 34 in a plurality of streams issuing from the openings 35 in contact with the material in each trough. The radial blades gradually and progressively move the admixed material toward the discharge end of the mixer while lifting, cutting and kneading it in transit. In the upward sweep of the blades, the material is constantly lifted and dropped in a curtain of falling particles. Under these conditions, the solution issuing from openings 35 is directed in a plurality of fine streams into the repeatedly subdividing mass and the curtain of particles falling from the blades during their rotation blankets and captures any vapors which are prevalent in the vicinity and prevents their escape from the chamber into the atmosphere. Instead, these vapors are caught in the path of the material and retained in the admixed mass. In completing the rotative cycle, the repeated downward stroke of the blades causes intense shearing and kneading of the mass of material.

The moist fertilizer mixture containing the superphosphate has pronounced plastic properties which favors granulation and the heat evolved from the reaction of the liquid ingredients and which is passed along into the mixer is sufficient to maintain the ingredients in a plastic state. In this system, there is little flow and the particles of one constituent are formed between the particles of other constituents until the whole mass is thoroughly mixed and all surfaces of solid particles are thoroughly wetted causing agglomeration of the admixed solid wetted particles into a granular homogeneous product. Every particle within each trough is eventually brought to the place where it is exposed to the liquids issuing from openings 35 and where it may best be subjected to this force because there is very little free space between the blades and the mixer walls. The mechanical action involved causes shear which brings about a new relationship to different portions of the partially mixed material and as the blades rotate they tear loose portions to other parts of the trough and into the adjoining trough, thus redistributing the contents. The material is constantly retumbled upon itself, on adjoining material and on fresh material with a constant realignment of the particles in the mass. By providing curved surfaces to the trough bases there is no opportunity for creating an inactive zone in the center of the chamber.

As the granulated material is progressively moved through the mixer, it is continuously discharged by means 30 and passed via chute 42 into the feed end of an inclined rotary drier 43. Hot combustion gases are fed concurrently with the granular material through the drier and the gases are withdrawn together with moisture by means of exit 44 and the dried granular product is passed from the lower end of the drier through chute 45 and fed directly into an inclined rotary cooler 46 where it is cooled by means of air. The flow of material through the cooler is effected by rotation of the inclined apparatus and passed to classifier 47 which serves to segregate the particles. The oversize particles are delivered to a grinding mill for particle size reduction and then reclassified while the fines are recycled to solids feed inlet 29 for reworking in the mixer 23. The product is bagged directly or conveyed to storage.

From the foregoing description, it will be appreciated that the present invention provides a process and suitable apparatus for preparing granular mixed fertilizers by the addition of liquid to solid fertilizer ingredients while avoiding formation of objectionable fumes. The invention is applicable to ammoniation of phosphatic materials, such as superphosphate, by introducing a mixture of liquid anhydrous ammonia and water through distributor conduit 34 in contact with superphosphate, or contacting superphosphate with a pre-reacted solution consisting of the reaction products of ammonia (anhydrous or aqua), water, nitrogen solution and sulfuric acid. The method of first pre-reacting liquid fertilizer ingredients and introducing the liquid reaction products in contact with solid ingredients according to this invention is amenable to preparation of a variety of mixed fertilizer goods. In addition to muriate of potash, other potassium salts, such as the nitrate or sulfate, may be used. The use of dolomite, triple superphosphate and suitable filler materials are within the scope of this invention.

According to this process, it is possible to prepare innumerable formulations containing varying units of fertilizer constituents. The following table presents a representative number of fertilizer mixtures using several sources of $P_2O_5$ and nitrogen:

the divided solid material in a more uniform wetting manner. This permits more efficient granulation while decreasing ammonia vapor losses. In addition, there is the advantage of granulating low nitrogen fertilizer mixtures with decreased acid usage as compared with previous requirements. This is primarily the result of more efficient chemical reaction causing increased temperature of the material in the mixer.

Another significant advantage of the present invention

Table

| Raw Material | Analysis | Grade | | | | | |
|---|---|---|---|---|---|---|---|
| | | 5-10-10 | 5-10-10 | 5-10-10 | 15-15-15 | 12-12-12 | 4-16-0 |
| | | Actual Pounds of Raw Material/Ton of Product | | | | | |
| Normal Superphosphate | 20% APA | 1,000 | 1,000 | 1,000 | | 834 | 1,600 |
| Triple Superphosphate | 46% APA | | | | 383 | 159 | |
| Phosphoric Acid | 75% $H_3PO_4$ | | | | 228 | | |
| Nitrogen Solution [1] (Allied 4M type) | 41% N | | | 45 | | | |
| Nitrogen Solution [2] (Sohio 16 type) | 41.4% N | | 244 | | 483 | 580 | |
| Anhydrous Ammonia | 82.25% N | 122 | | 99 | | | 97 |
| Sulfate of Ammonia | 21% N | | | | 476 | | |
| Sulfuric Acid | 66° Bé | 190 | 50 | 147 | 38 | 142 | |
| Muriate of Potash | 61% $K_2O$ | 328 | 328 | 328 | 492 | 394 | |
| Filler | | 410 | 443 | 435 | | | 365 |
| Total lbs. of Raw Material/Ton of Product | | 2,050 | 2,065 | 2,054 | 2,100 | 2,109 | 2,062 |
| Less Evaporated Material | | 50 | 65 | 54 | 100 | 109 | 62 |
| Pounds of Product Produced | | 2,000 | 2,000 | 2,000 | 2,000 | 2,000 | 2,000 |
| Lbs. of $NH_3$/Unit APA from Normal Superphosphate | | 6.0 | 3.0 | 6.0 | | 6.0 | 6.0 |
| Lbs. of $NH_3$/Unit APA from Triple Superphosphate | | | | | 4.0 | 3.9 | |

[1] 19% free $NH_3$; 72.5% ammonium nitrate; 8.5% water; 41% total nitrogen.
[2] 19% free $NH_3$; 65.6% ammonium nitrate; 9.4% water; 6% urea; 41.4% total nitrogen.

In carrying out the above tabulated formulations, the noxious mixer exhaust fume, which is usually apparent in existing systems as a dense whitish cloud, was virtually nonexistent. The fume cloud is normally formed when the sulfuric acid contacts and reacts with the muriate of potash causing formation of HCl, which in turn reacts with some of the free ammonia to form finely divided ammonium chloride. This comes off the mass of material as the dense white cloud. By pre-neutralizing the sulfuric acid in the mixing chamber 11, this source of ammonium chloride is eliminated and consequently exhaust fume is arrested.

Also it is now possible to blend water, anhydrous ammonia, and nitrogen solutions in a continuous flow through a single conduit thus providing an intimate mixture of liquid ingredients throughout the granulation process. One of the prior practices requires separate lines to introduce such liquids into the solid material. Separate introduction, however, has the disadvantage of distributing the liquids into the solids in a non-uniform manner. Another prior practice is to pre-react ammonia, nitrogen solution and sulfuric acid in amounts sufficient to yield an acidic solution (pH c. 6.0), introducing this solution into the ammoniator or granulator, and concomitantly therewith introducing additional quantities of ammonia and nitrogen solution into the ammoniator through separate lines. The disadvantage in this practice is that pre-reaction of the initial liquid ingredients on the acid side tends to promote formation of toxic gases coupled with the fact that separate introduction of the ammonia causes some loss of available nitrogen through ammonia vaporization.

In the present invention, the prior art disadvantages are avoided by pre-reacting all liquid ingredients on the alkaline side and introducing the resulting solution in a single flow into contact with the solids. Moreover, by providing a centrally divided mixer and disposing the liquids distributor between the divided portions above the mixer base, the liquid reaction products are sprayed into is the ability to pre-neutralize ammonium nitrate-urea solutions with sulfuric acid without generating abundant quantities of toxic gases. Heretofore, attempts to carry out pre-neutralization using ammonium nitrate-urea solutions were beset with a very copious gas evolution during the mixing step. These gases, some of which were of a hazardous nature, consisted substantially of nitrous oxide and nitrogen dioxide, which not only created an undesirable condition but also represented a definite loss of nitrogen from the system. Such gas evolution is eliminated in the present invention by operating the pre-neutralization phase with a substantial excess of ammonia and at a high pH.

As thus described, this invention provides a process and apparatus which (1) eliminates fume formation in the mixer, (2) reduces nitrogen losses due to better ammonia absorption in the mixer, (3) permits the use of lower cost in raw materials due to higher usage of anhydrous ammonia, and (4) obtains a smoother mixing operation. Moreover, this invention permits granulation on a 24-hour production day basis compared to prior practices which are frequently interrupted for 2 to 4-hour shutdown periods because of mixer overloading.

We claim:

Liquid blending apparatus comprising a first cylindrical blending chamber having an open end and a closed end, thus forming an elongated confined space; a first delivery tube extending through the closed end of said first chamber for a substantial distance therein, which distance is between the open and closed ends of the said first chamber, said first tube being closed at its extended end and disposed so as to provide an annular space between said first chamber and said first tube; a plurality of spaced wall openings in the extended portion of said first tube to provide communication between the interior thereof and said annular space for a substantial longitudinal area portion of the said first delivery tube; a second delivery tube communicating with the aforesaid annular space at a point between said plural openings and the closed end of said first chamber; a separate second cylindrical blending chamber having an open end and a closed end, thus forming a second elongated confined space of substantially uniform diameter; a third delivery tube of substantially uniform diameter extending through the closed end of said second chamber for a substantial distance therein, which distance is between the open and closed ends of said second chamber, said third delivery tube being disposed so as to provide annular space between said third tube and said second chamber, said third delivery tube communicating with the interior of said second chamber by means of perforations in its terminus; said first blending chamber being connected to said second blending chamber by a fourth tube connecting the open end of said first chamber with the annular space in said second chamber at a point between the closed end of said second chamber and the point at which the said third delivery tube communicates with said second chamber, said fourth tube being substantially concentric with said first mixing chamber.

References Cited in the file of this patent

UNITED STATES PATENTS

| | | |
|---|---|---|
| 271,025 | Bourgedis | Jan. 23, 1883 |
| 945,143 | Szamek | Jan. 4, 1910 |
| 1,871,416 | Broadfield | Aug. 9, 1932 |
| 2,065,583 | Heitzmann | Dec. 29, 1936 |
| 2,682,277 | Marshall | June 29, 1954 |
| 2,853,100 | Donnelly | Sept. 23, 1958 |
| 2,886,426 | Gera | May 12, 1959 |
| 3,024,806 | Colonna | Mar. 13, 1962 |

FOREIGN PATENTS

| | | |
|---|---|---|
| 351,918 | Germany | Apr. 19, 1922 |